United States Patent
White et al.

(10) Patent No.: US 7,522,751 B2
(45) Date of Patent: Apr. 21, 2009

(54) SYSTEM AND METHOD FOR PROTECTING THE PRIVACY AND SECURITY OF STORED BIOMETRIC DATA

(75) Inventors: Conor White, Galway (IE); Michael Peirce, Dublin (IE)

(73) Assignee: Daon Holdings Limited, George Town (KY)

(*) Notice: Subject to any disclaimer, the term of this patent is extended or adjusted under 35 U.S.C. 154(b) by 690 days.

(21) Appl. No.: 11/112,513

(22) Filed: Apr. 22, 2005

(65) Prior Publication Data
US 2006/0239511 A1  Oct. 26, 2006

(51) Int. Cl.
*G06K 9/00* (2006.01)
(52) U.S. Cl. .................. 382/115; 340/5.53; 340/5.83
(58) Field of Classification Search ............ 382/115; 340/5.53, 5.83
See application file for complete search history.

(56) References Cited

U.S. PATENT DOCUMENTS

| | | | |
|---|---|---|---|
| 5,606,610 A * | 2/1997 | Johansson | 713/193 |
| 6,045,039 A * | 4/2000 | Stinson et al. | 235/379 |
| 6,105,131 A | 8/2000 | Carroll | |
| 6,246,989 B1 | 6/2001 | Polcyn | |
| 6,256,737 B1 | 7/2001 | Bianco et al. | |
| 6,421,729 B1 | 7/2002 | Paltenghe et al. | |
| 6,603,462 B2 * | 8/2003 | Matusis | 345/173 |
| 6,853,988 B1 * | 2/2005 | Dickinson et al. | 705/75 |
| 2003/0101339 A1 * | 5/2003 | Bianchini et al. | 713/153 |
| 2004/0236694 A1 | 11/2004 | Tattan et al. | |
| 2004/0250085 A1 | 12/2004 | Tattan et al. | |

FOREIGN PATENT DOCUMENTS

| | | |
|---|---|---|
| EP | 0 884 670 B1 | 4/2002 |
| WO | WO 01/18631 A1 | 3/2001 |
| WO | WO 01/33936 A2 | 5/2001 |
| WO | WO 01/33936 A3 | 5/2001 |
| WO | WO 2004/031922 A2 | 4/2004 |

OTHER PUBLICATIONS

PCT/EP2005/051817 International Search Report, Sep. 15, 2005.

\* cited by examiner

*Primary Examiner*—John B Strege
(74) *Attorney, Agent, or Firm*—Hogan & Hartson LLP (57) ABSTRACT

A data storage system that protects privacy and ensures security includes a plurality of nodes in a networked architecture, the nodes being adapted to securely communicate and co-operate with one another to allow storage and retrieval of data. A single piece of biometric data is associated only with a blinded identifier and securely divided across one or more nodes, adapted for data storage. The data itself and the link to the original individual, from whom the biometric was acquired, cannot be obtained without the co-operation of two or more nodes.

16 Claims, 6 Drawing Sheets

SYSTEM AND METHOD FOR PROTECTING THE PRIVACY AND SECURITY OF STORED BIOMETRIC DATA

FIELD OF THE INVENTION

The present invention relates to the privacy and protection of stored biometric data, and in particular to a computer implemented architectures and methodology providing for the separation of data between repositories.

BACKGROUND

Systems for authenticating the identity of an individual are now becoming widely deployed. Such systems may be used to enhance security at a border crossing, to identify individuals in a citizen ID scheme, to allow physical access to a building, to provide logical access to networks and computer applications, to prove identity during retail transactions, amongst many other possible applications.

Known techniques used within such authentication systems for validating the identity of an individual include the use of passwords, tokens, biometrics, or any combination of these. Within a biometric-based system, biometric samples are captured from an individual and enrolled, or stored, within the system for use in later authentications. Examples include fingerprint, iris, or face images, or a recorded sample of a voice.

Features may be extracted from the image to generate biometric templates. These are usually a smaller compact representation of the biometric features present in the image. Typically, the templates are used in the day-to-day operations of the system to authenticate individuals whereas the original biometric data or images is stored or archived. There are many valid reasons for storing this data. Some examples include:

- Re-generating templates from the data if the original templates are no longer available, such as in a system where templates are stored on a portable card and the card is misplaced or stolen
- Generating templates using an enhanced version of the algorithm
- Allowing algorithm migration by generating new templates using different algorithms, without having to re-enroll the user
- Processing the data within biometric experiments including algorithm and sensor benchmarking
- Using the data as part of a forensic examination Ensuring the security and privacy of stored personal data in today's electronic environment is important. Attempts to gain access to such personal data, such as that against Choice-Point™, are becoming more and more common. With biometric data, in particular biometric images, these security issues are of a paramount importance. The biometric data must be protected, not only to ensure the security of the authentication scheme, but also to maintain the privacy and rights of its users. If an attacker were able to obtain a biometric image and the identity of the person to whom that image belonged, then there would be no privacy present. Therefore, in the storage of biometric images it is important to note that the biometric in itself provides no indication as to who the person who provided the biometric is, it is the association of that image with an identifier for that person and that couplet or pair that provides the real threat.

As such, even if an attacker is able to gain access, in an unauthorized manner, to the stored biometric images, it should be impossible for that attacker to determine from which individual the biometric data was acquired. The logical link between a user's personal data and the biometric images needs to be protected. Current state-of-the-art biometric storage systems do not provide this capability, as they typically store the user identifier along with the corresponding biometric image in the same database, often using the identifier to index the image for later retrieval.

There is therefore a need to provide a method and system for protecting the privacy of stored biometric data, and in particular ensuring that the link between the biometric data and the user from whom those images were acquired is strongly safeguarded.

SUMMARY OF THE INVENTION

These and other problems are addressed by a method and system in accordance with the invention which provides for improvements in the privacy and protection of stored biometric data associated with an individual, through use of a number of independent entities and cryptographic techniques.

A first embodiment of the invention provides a data storage architecture and methodology that protect privacy and ensures security. In this embodiment, the system includes a plurality of nodes in a networked architecture, the nodes being adapted to securely communicate and co-operate with one another to allow storage and retrieval of data. A single piece of biometric data is associated only with a blinded identifier and may additionally be securely divided across one or more nodes, adapted for data storage. The data itself and the link to the original individual, from whom the biometric was acquired, cannot be obtained without the co-operation of two or more nodes.

Accordingly, the invention provides a method of securely indexing and storing a biometric for subsequent retrieval. The invention also provides a network architecture.

These and other features will be better understood with reference to the description which follows.

DETAILED DESCRIPTION

Within the present specification certain terms will be used to represent certain components of the system. The following list of definitions is intended to define these terms for ease of explanation and understanding of the following description of an exemplary embodiment of the present invention. It will be understood that these definitions are not intended to limit the invention in any way but are simply presented to ease an understanding of the invention.

Data Collection Server (DCS)

A system that obtains user-related information, typically including user demographic information and biometric data. This could be part of an authentication server which receives user enrollment data from one or more enrollment applications and/or legacy systems. It may also collect the data directly from the user.

Biometric Storage Server (BSS)

The Biometric Storage Server is responsible for storing or archiving biometric data. This data might include biometric images and/or biometric templates, and there may be multiple instances of each originating from a single user. The biometric data may only be accessed, retrieved, or operated on by authorized entities.

Index Governor (IG)

The IG entity, if present, maintains a link, or method for automatically generating that link, from data held at one entity to data held at another entity, where the details of the link are unavailable to any entity outside the IG. In one embodiment the link is between a user identity/record and the corresponding user biometric (image) data. The IG functionality may be implemented on any system or component that can perform the necessary calculations. Implementations may be available on standard host computers, a handheld device, a hardware security module (HSM), or a token with a processor such as a smart card or USB key. If a personal device is used to provide the IG functionality, this may be limited to operating on a smaller number of data elements, typically those belonging to the carrier or owner of the personal device, compared to other implementations.

Data Blinding Mechanism (DBM)

The data blinding mechanism takes a data input and produces a data output, where the data output reveals no information about the data input. The data blinding mechanism itself may be a public algorithm, such as a one-way hash function.

Data Splitting Mechanism (DSM)

The data splitting mechanism takes a data input and produces two or more data outputs, where a single data output alone reveals no information about the data input. Depending on the data splitting algorithm(s) applied a number of data outputs, derived from the same single data input, may be used to reconstruct the original data input. The data splitting mechanism itself may be a public algorithm, such as an exclusive-OR (XOR) function, as detailed in a later example.

Identity Data Element (IDE)

An Identity Data Element is a piece of information (or a set of IDEs) which comprise information about an individual. Examples of IDEs include (but are not limited to) a unique user identifier within a specified system, social security number, credit card number, email address, employee id, dynamically generated authentication tickets etc.

User Details Record (UDR)

A user details record is a set of one or more identity data elements containing information about or relating to a specific identified individual. Example information held in a UDR, or set of UDRs, might include name(s), individual physical characteristics such as age/height/sex etc., employment details, home/office addresses, family information, citizenship details, place/country of birth, privileges/benefits associated with the individual, financial history and status, transaction records and so on. There may also be information on the operator(s) who collected or issued the record details.

Biometric

A biometric is any one of a plurality of biological identifiers which can be associated with a user such as but not limited to an identifier defined by finger, iris, face, voice, hand geometry, gait, DNA etc.

Biometric Capture Device

A biometric capture device is intended to include devices suitable for reading various biometric modalities including finger, iris, face, voice etc. The Biometric Capture Device for the purpose of this invention also includes the controlling software for the device—whether residing on the device or another device such as a client PC for example.

Biometric Image

A biometric image is the raw sample data acquired using a biometric capture device. Examples include an image of a fingerprint, iris, face, or hand, or a voice sample recording.

Biometric Template

A biometric template is generated from one or more biometric images by applying one or more processing algorithms. Typically, the processing algorithm will extract features from the biometric image and represent them in a more compact form.

The invention will now be described with reference to an exemplary system which provides a biometric vault that increases privacy and security compared to earlier solutions.

Within the implementation of the system of the present invention methods are provided to separate the association between an individual and their actual biometric identifier(s). It will be appreciated that this separation is advantageous for a number of reasons including: a protection of the privacy of the individual, a protection of the integrity of the storage system, provision of anonymous biometric data for testing purposes.

According to a preferred embodiment of the present invention a DCS collects individual data including one or more IDEs, UDRs, and associated biometric data. The DCS, with or without the aid of one or more IGs, stores the biometric data, indexed by a blinded version of an IDE, within a BSS. Furthermore, the biometric data may be split between multiple entities, including one or more BSS, IG, or DCS entities.

It will be appreciated that in order to implement a secure data storage vault that the individual components within the vault architecture should communicate with one another in a secure manner such as that established through the use of encryption, public key cryptography and digital signatures. Furthermore, in addition to the methods presented in this invention, it is understood that any sensitive data will be stored in a secure manner using traditional security techniques.

It will be appreciated that the method of the present invention provides for the encryption of sensitive data and protocols. Many forms of establishing trust are known and will be appreciated by those skilled in the art including both symmetric and asymmetric encryption, signature schemes, SSL techniques and XML documents.

It will be understood that the concept of storing enrolments and biometric data across organisations or networks has traditionally been viewed as dangerous or controversial from a consumer acceptance perspective. Fears of an attacker gaining access to the data, of selling biometric data, and of giving away identity invoke all the wrong images in the minds of the consumer. The present invention obviates these problems by breaking the link between the biometric data and the individual and by splitting the data securely across multiple locations. Unauthorized access to any one location provides no useful data to an attacker.

Identity Elements

An individual can have a Personal Identity with multiple Identity Data Elements—for example, a public key certificate with its corresponding private key, a name, a credit card number etc.

Data Blinding Function

The data blinding mechanism takes a data input and produces a data output, where the data output reveals no information about the data input. The blinding function should also be collision resistant in that it should be highly unlikely that two different data inputs will produce the same data output.

In a preferred embodiment the data blinding function, Blind( ), is a secure hash function, such as SHA-1 or MD5, which is applied to the data input concatenated to a secret random string value, the "salt", known only by the entity performing the blinding. However any suitable secure data blinding function or system may be used.

We use the notation Blind_N(D) to mean that a blinding function has been applied N times to data D. For example:

Blind_1(D)=Blind(D)

Blind_2(D)=Blind(Blind(D))

Blind_3(D)=Blind(Blind(Blind(D)))

Blind_$N$(D)=Blind(Blind_$N$−1(D))

The notation does not specify what underlying functionality has been used to implement the blinding function, and when several blinding functions are applied one after another as above, different blinding functions and configuration parameters may be used on each iteration. Multiple blinding functions may also be used, serially or otherwise, within a single iteration.

The blinding function is selected so that the probability of an "output collision", where two different data inputs produce the same output value, is highly unlikely. The selection of an appropriate function will be based on the maximum population size used within the system, amongst other parameters.

Each entity may keep a record of all output values produced when using the blinding function. If a collision does occur a number of options exist. One of these is to add a value either to the data input or to the data output, the result of which is a new data output value. If this additional concatenation is performed, it should be recorded alongside the corresponding data input, so that it may be correctly re-generated at a later date.

One known method to produce a longer output from an existing secure hash function involves the following steps. The data input, M, is hashed to produce H(M). A second hash value is then produced by hashing this first hash value with the original message H(H(M), M). An output value is formed by concatenating the two hash values to produce {H(M), H(H(M), M))}. Even if H(M1) is equal to H(M2), it is extremely unlikely that the final output will now be the same.

Data Splitting Mechanism

The data splitting mechanism takes a data input and produces two or more data outputs, where a single data output alone reveals no information about the data input. The notation Split(Input, N) is used to represent the splitting function that takes a single input and returns a set of data with N elements. In a preferred embodiment the data splitting function, Split(Input, N), uses an exclusive-OR (XOR) function. (N-1) random strings, of equal length to the data input, are generated and XOR'd with the input, to produce a final string value. The (N-1) strings and the XOR output string form the pieces of split data. To re-assemble the original input data, all N strings must be XOR'd together. For example, given input I, when N=2:

I XOR D_1=D_2

(Here D_1 and D_2 are the data output pieces) To re-assemble the input, given the two data outputs:

D_1 XOR D_2=I

We use the notation Split(Input, N)→(D_1, D_2, ..., D_N−1, D_N) to refer to the data splitting function which splits a single input into N parts, where the output parts are labelled D_1, D_2, up to D_N.

Architecture Configurations

A number of system architectures are now presented, showing the exemplary embodiments of the invention. They differ mainly in the number of entities involved, and in the data shared between these entities. All architectures enhance the privacy and security of a traditional biometric data archive.

The architectures covered include:
Two entities: Data Collection Server and Biometric Storage Server
Three entities: Data Collection Server, Index Governor, and Biometric Storage Server
N entities: Data Collection Server, and multiple Index Governors and Biometric Storage Servers A single Data Collection Server is used for illustrative purposes in the above architectures. However individual identities and biometric data may be collected at multiple collection servers, before being operated on and passed to the other entities participating in the protocols.

The DCS is the first entity that has access to the biometric image data before it is securely and privately stored by the BSS. In the privacy protocols described, the DCS does not keep a copy of the image data after it has been securely stored by the BSS, unless stated otherwise. Furthermore this act will typically be auditable to ensure that the image has in fact been permanently deleted.

Two Entities: Data Collection Server with Biometric Storage Server

Figure 1:
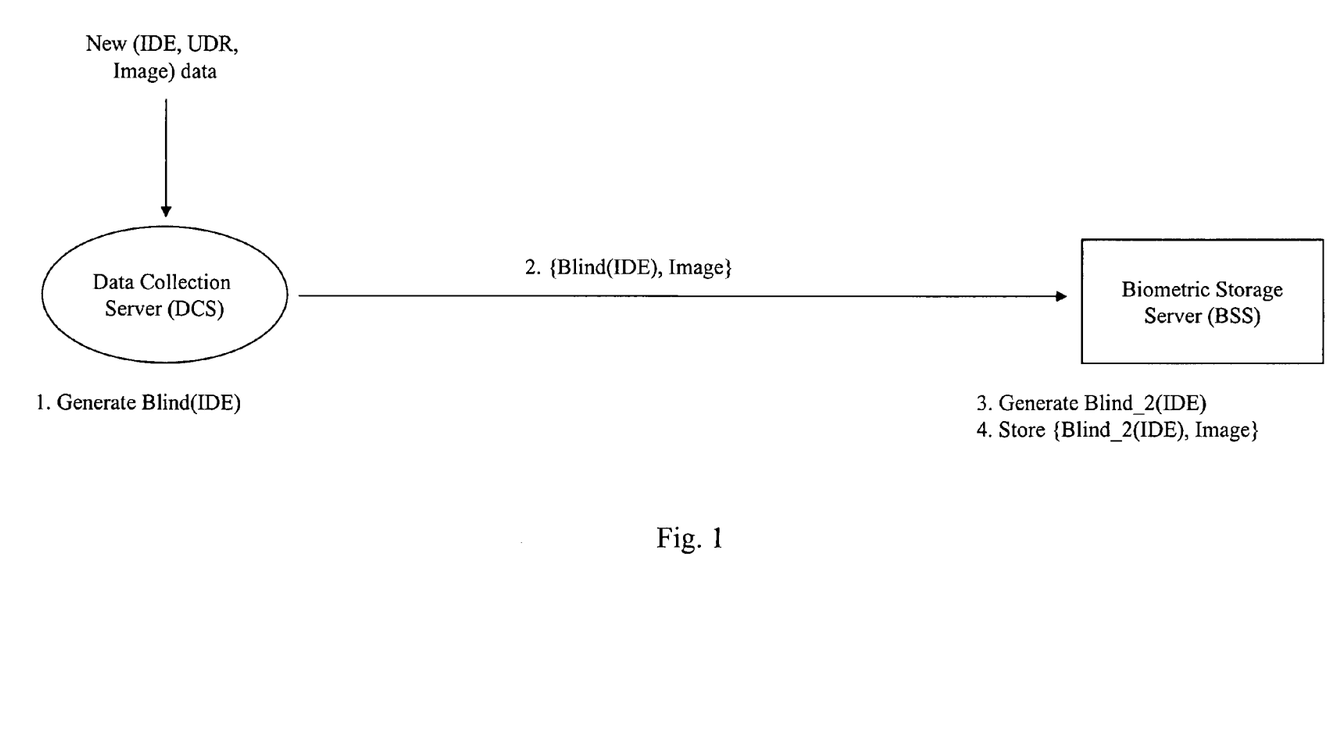
FIG. 1 is a process sequence, involving two entities, showing how biometric data is privately stored using data blinding.

In this configuration the DCS communicates directly with a BSS, as shown in FIG. 1.

After an enrolment the DCS will hold the identity data element (IDB), user details record (UDR), and biometric image(s) belonging to an individual. The user details record is stored at the DCS or by external datastores.

In order to store an individual's biometric image in a privacy-enhancing manner, the steps outlined in FIG. 1 take place.

Step 1, The DCS applies the preferred data blinding mechanism to the IDE, to generate the value Blind(IDE). This blinds or hides the value of the original IDE, and prevents the holder of Blind(IDE) retrieving the original IDE.

Step 2, The DCS sends the biometric image, along with the blinded IDE to the BSS for storage:

DCS->BSS: {Blind(IDE), Image}

Step 3, The BSS optionally re-blinds, or double blinds (Blind_2(IDE)), the blinded IDE. This further ensures that both the BSS and DCS must co-operate in order to retrieve the image for a specified IDE. Otherwise only the DCS-generated Blind(IDE) is used as the datastore index to the image.

Step 4, The BSS stores the Image encrypted in its datastore, indexed by the single or double-blinded IDE:

(Blind_2(IDE), Image)

2-entity Image Retrieval

In order to retrieve an Image for a presented IDE, the original DCS must re-create Blind(IDE), then the BSS must re-create Blind_2(IDE) if double-blinding was used, and then this is used as the BSS datastore index to retrieve the correct image.

2-entity Image Splitting

One drawback of storing the entire image in a single datastore, even if it is encrypted, is that if that datastore and its associated cryptographic keys are compromised, then all the images are available to the attacker, even if the IDEs remain unknown.

Figure 2:
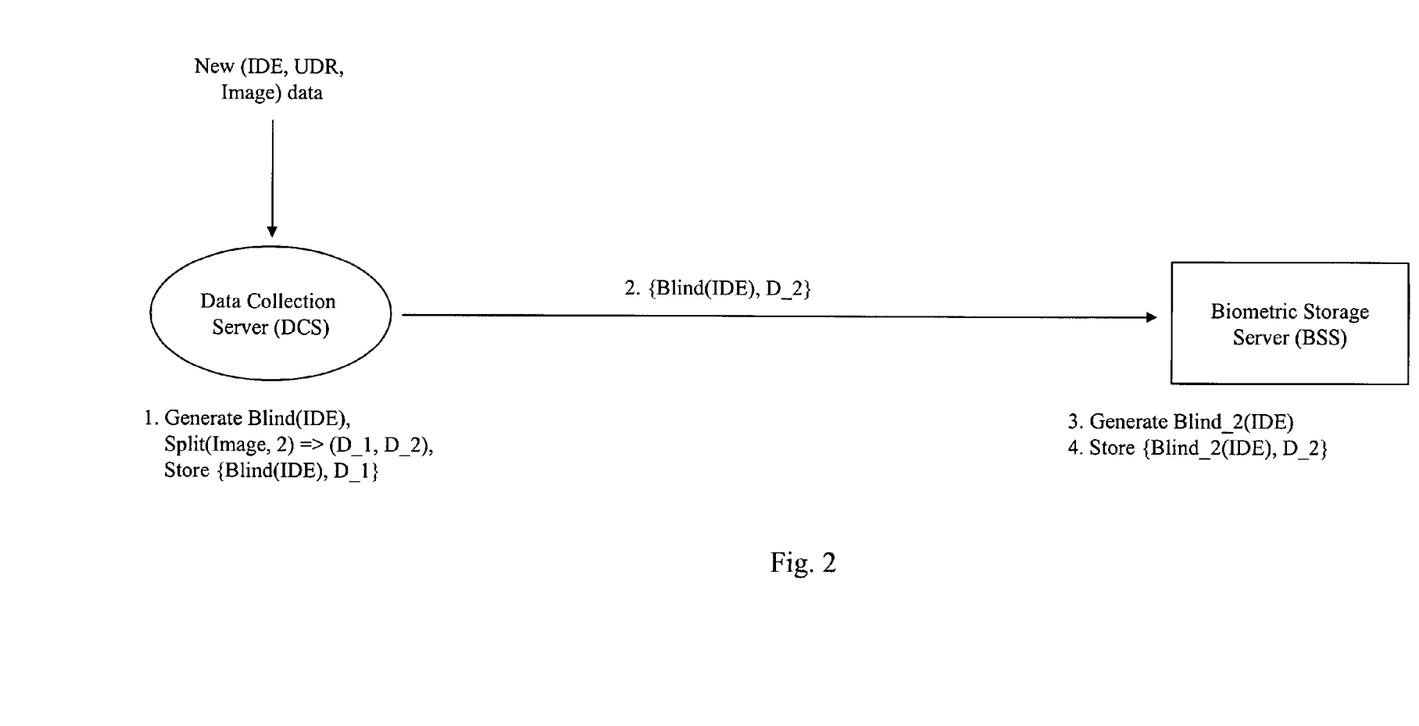
FIG. 2 is a process sequence, involving two entities, showing how biometric data is privately stored using data splitting in addition to data blinding.

To alleviate this risk, the image data may be split, in a secure manner, between the two entities, and the split parts stored at two separate locations, as shown in FIG. 2. In this scenario, the DCS splits the Image, in step 1 above, into two pieces, using Split(Image, 2), generating pieces D_1 and D_2. DCS keeps part D_1 and securely stores it in encrypted form. Part D_2 is sent, instead of the full original Image, to BSS in step 2 above. Now, in the image retrieval process, both the DCS and BSS must combine their two separate parts together to re-generate the original image.

Three Entities: Data Collection Server, Index Governor, and Biometric Storage Server In this configuration the DCS communicates with both the IG and BSS, as shown in FIG. 3.

As before, after an enrolment the DCS will hold the IDE, UDR and biometric image(s) belonging to an individual. As mentioned earlier, all communications can be protected using secure network communications protocols, with encryption and digital signing.

Figure 3:
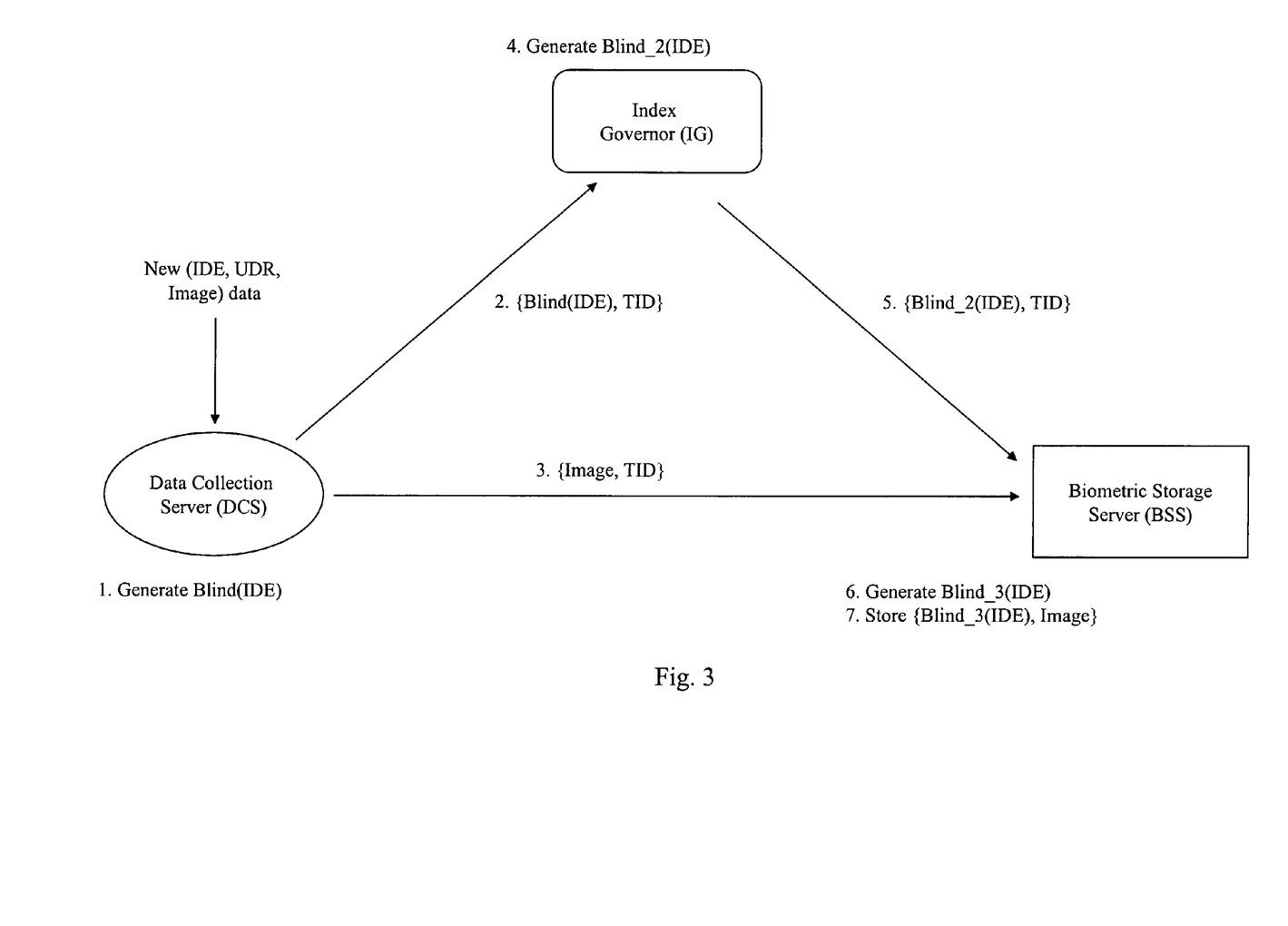
FIG. 3 is a process sequence, involving three entities, showing how biometric data is privately stored using data blinding.

To further improve the privacy of biometric data storage, the following steps take place, as outlined in FIG. 3:

Step 1, The DCS applies the preferred data blinding mechanism to the IDE, to generate the value Blind(IDE).

Step 2, The DCS sends this along with a transaction identifier (TID) to the IG:

DCS->IG: {Blind(IDE), TID}

Step 3, The DCS sends the image and the same TID as used in step 1 to the BSS:

DCS->BSS: {Image, TID}

Step 4, The IG blinds the IDE a further time, creating Blind_2 (IDE). There is no need to store this, as it can be re-generated when required later. The IG may use a different blinding function than the DCS, and will use a different secret-key or "salt" input to the function in any case.

Step 5, The IG sends the double-blinded IDE to the BSS:

IG->BSS: {Blind_2(IDE), TID}

Step 6, In the optional step 6 the BSS further blinds the IDE, to form a triple-blinded value of Blind_3 (IDE). This further ensures that the BSS must be intricately involved in order to retrieve the image for a specified IDE.

Step 7, The BSS retrieves the two messages received with the same TID, and stores the double/triple-blinded IDE and the image. The TID need not be stored, as after the transaction it is no longer required.

After the transaction completes, the DCS provably deletes the transaction data including TID. The IG and BSS also delete records of TID.

It is noted that the ordering of some of the communications steps is not strict and can be changed. For example, step 3 can take place before step 2, or both steps can take place at the same time. Similarly, step 5 could take place before step 3. However, steps 6 and 7 must take place in order and be the final steps, if present.

3-entity Image Retrieval

In order to retrieve an Image for a presented IDE, the original DCS must re-create Blind(IDE), the IG must then create Blind_2(IDE). If the BSS also blinded the IDE, then it must compute a further blind of this value. The final blinded value (double or triple-blinded) is used as the BSS datastore index to retrieve the correct image.

3-entity Image Splitting

Figure 4:
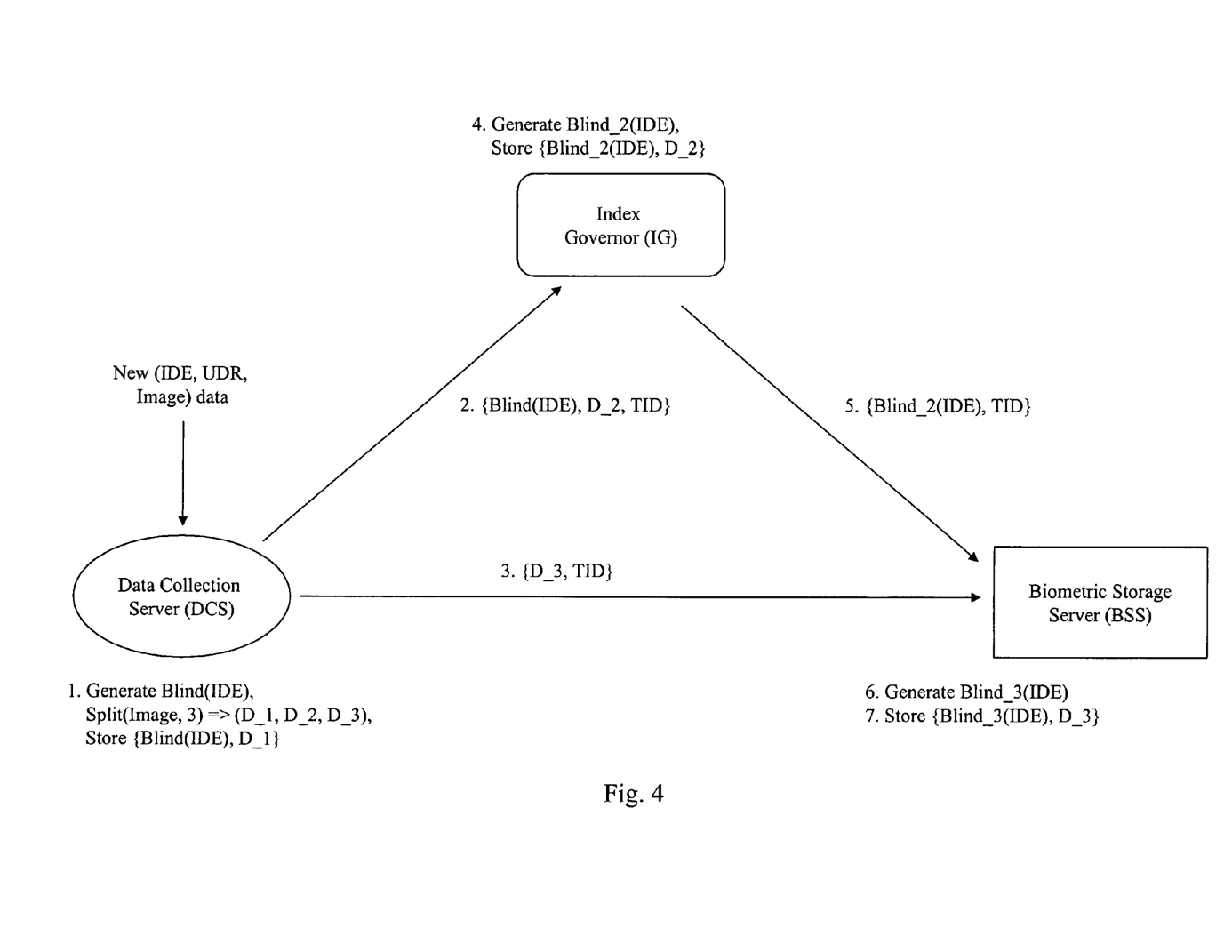
FIG. 4 is a process sequence, involving three entities, showing how biometric data is privately stored using data splitting in addition to data blinding.

As with the 2-entity protocol, the image may be split into several pieces, as shown in FIG. 4.

In the first case, it may be split into two pieces by the DCS who then gives one piece each to the IG and the BSS. If the image is split into data parts D_1 and D_2, then part D_1 is sent to the IG in step 2 and part D_2 is sent to the BSS in step 3.

DCS->IG: {Blind(IDE), D_1, TID}

IG stores: {Blind_2(IDE), D_1}

DCS->BSS: {D_2, TID}

BSS stores: {Blind_3(IDE), D_2}

In a second scenario, the data may be split into three pieces by the DCS who then gives one piece each to the IG and the BSS, and keeps the remaining piece. The DCS always deletes any data pieces that it has sent to other entities.

In both cases all involved entities must put their pieces together to assemble the original data. During data reconstruction images may be communicated between the parties using secure network communications or using secure piece recombination protocols as appropriate for the data splitting functions used.

Figure 5:
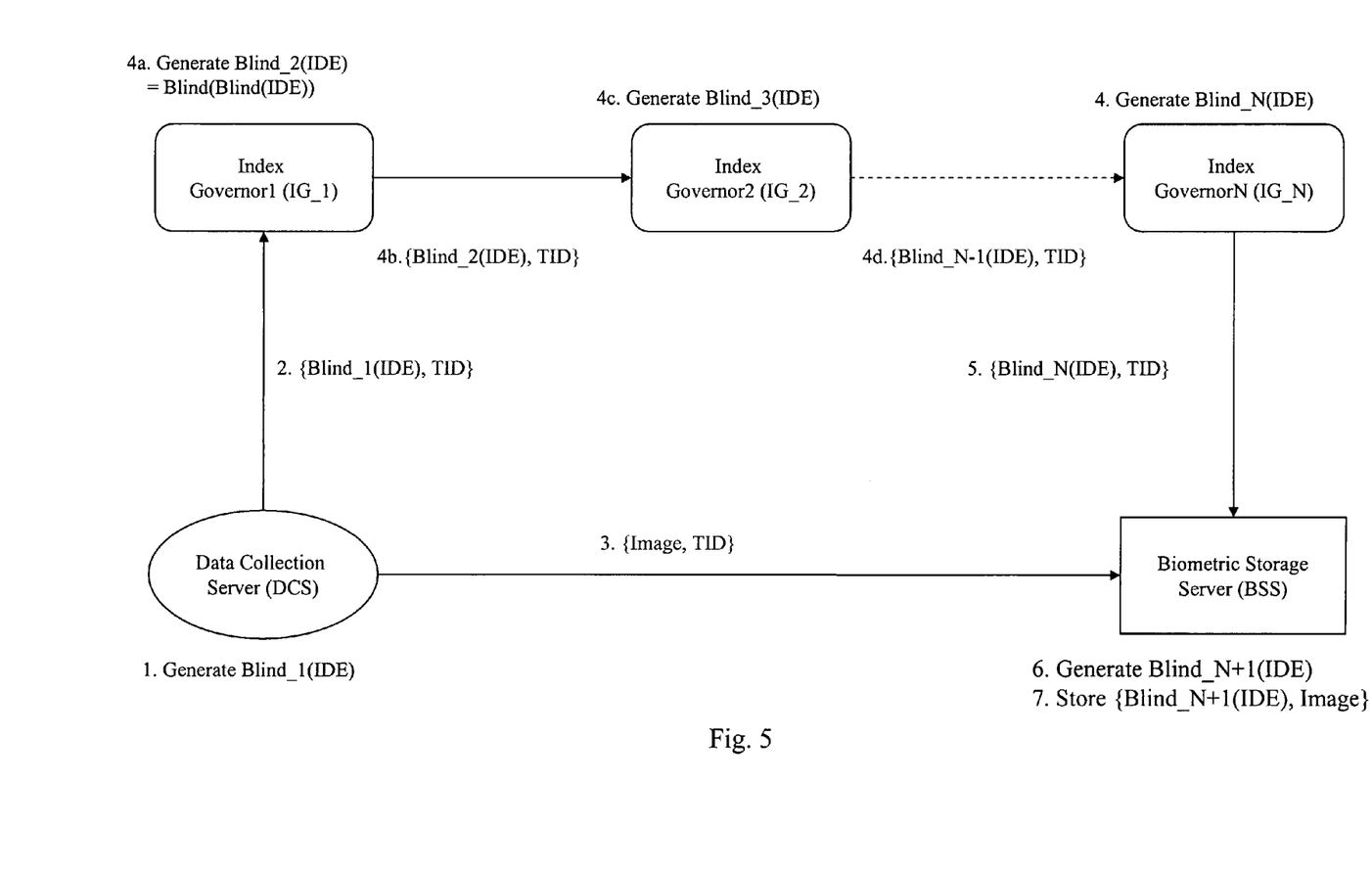
FIG. 5 is a process sequence, involving N entities, showing how biometric data is privately stored using data blinding.

N Entities: Data Collection Server, and Multiple Index Governors and Biometric Storage Servers In this configuration the DCS communicates with a first IG and a BSS. There is a chain of IG entities which communicate amongst themselves. The first IG entity will typically communicate with the $2^{nd}$ IG entity which in turn will communicate with a $3^{rd}$ IG if present and so on up to N entities. If data splitting is used then the roles of the IG and BSS entities are very similar.

Following data collection the DCS will hold the IDB, UDR and biometric image(s) belonging to an individual. To increase the privacy and security of biometric data storage, the following steps take place, as shown in FIG. 5:

Step 1, The DCS applies a data blinding mechanism to the IDE, to generate the value Blind(IDE).

Step 2, The DCS sends the blinded IDE along with a TID to the first IG in the chain:

DCS->IG_1: {Blind(IDE), TID}

Step 3, The DCS sends the image and the same TID as used in step 1 to the BSS:

DCS->BSS: {Image, TID}

Step 4a, The IG_1 blinds the IDE a further time, creating Blind_2(IDE), and stores it. As before, the IG may use a different blinding function than the DCS, and will use a different secret-value or "salt" input to the function. The salt value should be securely stored, but typically the same salt value will be used for a large number of transactions within a single entity.

Step 4b, The IG_1 sends the re-blinded IDE to the next IG (IG_2) in the chain:

IG_1->IG_2: {Blind_2(IDE), TID}

IG_2 repeats the process that IG1 performed in steps 4a and 4b. That is, the IG_2 blinds the already blinded IDE a further time, before storing it and then transmitting it on to the next IG entity in the chain.

The end result is that the final IG in the chain, IG_N, holds an IDE value that has been blinded N times, Blind_N(IDE).

Step 5, The final IG in the chain, IG_N, sends the IDE value that has been blinded N times to the BSS:

IG_N->BSS: {Blind_N(IDE), TID}

Step 6, In the optional step 6 the BSS further blinds the IDE, to form a (N+1)-blinded value of Blind_N+1(IDE). This further ensures that the BSS must be intricately involved in order to retrieve the image for a specified IDE.

Step 7, The BSS retrieves the two messages received with the same TID, and stores the N-blinded IDE and the image.

It is noted that the ordering of the communications steps can be modified if required. For example, the DCS can communicate with the BSS before, after, or at the same time as communicating with IG_1.

N-entity Image Retrieval

In order to retrieve an Image for a presented IDE, the original DCS must re-create Blind(IDE), and the IGs which were originally involved must each re-compute their blinding portion so that the value Blind_N(IDE) is attained. If the BSS also blinded the IDE, then it must compute a final blind of this value. The final blinded value (Blind_N(IDE) or Blind_N+1 (IDE)) is used as the BSS datastore index to retrieve the correct image(s).

N-entity Image Splitting

Figure 6:
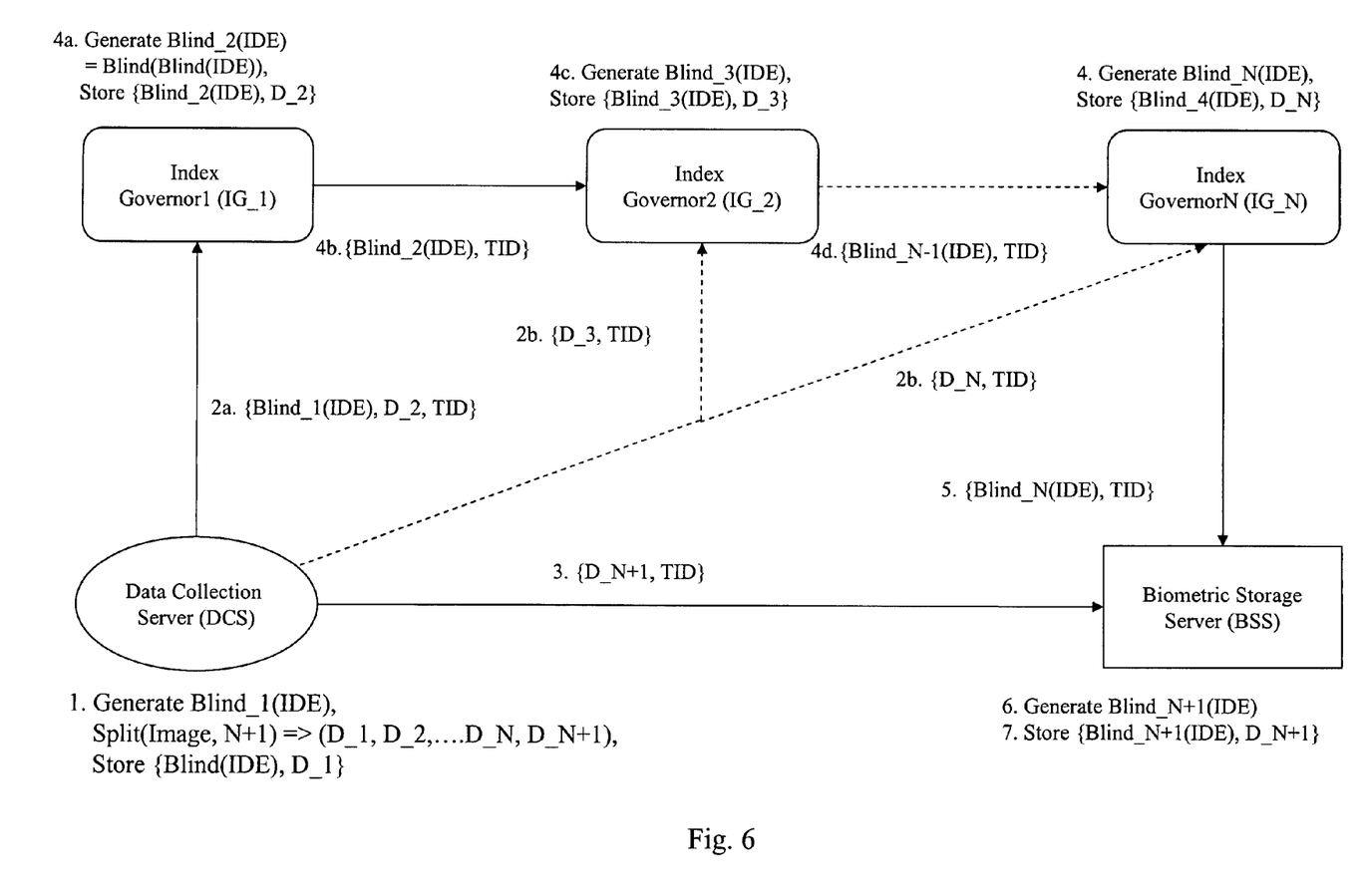
FIG. 6 is a process sequence, involving N entities, showing how biometric data is privately stored using data splitting in addition to data blinding.

As with the 3-entity protocol, the image may be split into several pieces, as shown in FIG. 6. There are a number of options available as to how many pieces to split the data into and who to share it with. The options include, but are not limited to the following:

Split the data between one or more IGs and the BSS

Split the data between one or more IGs, the BSS, and the DCS

After the DCS has split data, let one or more IGs sub-split a piece of data into further pieces and share these pieces with one or more other IGs Where both the IGs and BSS are storing split data, their roles become very similar.

The entity performing the data splitting operation may distribute the split parts directly to the entities involved, as shown in FIG. 6. Alternatively, the split parts may be forwarded to the necessary entities through other entities as part of the blinding protocol described above. In this case the semi-secret split part may be hidden from the entities it is passing through using encryption. One example would be to encrypt the split part with a public key of the entity it is destined for, so that any entities that this information is relayed through, cannot gain access to the data.

All involved entities must put their pieces together to assemble the original data. During data reconstruction piece-data may be communicated between the parties using secure network communications or using secure piece recombination protocols as appropriate for the data splitting functions used.

Multiple Biometrics Per Individual

Multiple biometric samples may be acquired from an individual. For example, finger images from different fingers might be captured, or images of the iris and face might be acquired. In such cases, the biometric data may be collated together as a single set, and stored privately under the same single IDE value.

Alternatively, a different IDE value may be used for each different biometric image or subset of biometric images to be stored, potentially further increasing privacy. One way to achieve this is to append or prepend an additional identifier for the particular biometric being stored to the original IDE which uniquely identifies the individual within a system, and use this concatenated or transformed IDE. A similar process may be followed when new biometrics are added or replaced for a given individual.

It will be appreciated that the present invention provides a system and methodology specific to the protection of biometrics. By effectively isolating an identifier of the person who provided the biometric and the biometric it is possible to safely and securely store these biometrics for a myriad of future application. The technique of the present invention enables an indexing of the biometric using a personal identifier but once indexed that pairing can only be retrieved if the steps that were used to create the index pair are followed. This means that if a person of unscrupulous nature were to gain access to the biometric storage database that they would not be able to glean information as to which person each of the biometrics related to, and therefore the accessed information is of limited use. The retrieval of the correct biometric for a specific individual requires cooperation between different entities.

As mentioned in the background to the invention the storage of biometrics has many applications. In accordance with the present invention it is now possible to effectively index and store biometrics in a way that allows access to these stored biometrics in a controlled fashion. It is therefore easier to use the stored data, whereas previously the necessity to maintain the security meant that interaction with that stored data was kept to a minimum. By enabling a secure indexing and retrieval, biometric data stored in accordance with the techniques of the present invention may be used more frequently. Examples of such use include the issuance/re-issuance and authentication of biometrically enabled financial cards such as debit, credit, or other payment cards.

In this specific field of financial cards, there is a constant trend towards increasing the security of the use of the cards. The traditional magnetic swipe strip of the card is being replaced with chip and pin technology. A biometric enabled card provides an additional level of security where the personal identifier used to authorise the payment is a parameter generated from a biometric of that person. In such environments, the biometric feature provided on the card will not typically be a raw biometric but rather a template mathematically generated from the raw image. The image, once used to generate the template, can then be stored in accordance with the techniques of the invention. If, at a later date, the template on the card need authentication, against the original enrollment data, then it is possible to retrieve the stored image, regenerate a template from that image and compare the two templates. If they match, then authentication is achieved if they don't it is not. This authentication will normally be achievable or conducted post transaction but does offer a secure manner to verify that a transaction conducted using a biometrically enabled card was in fact conducted using the card that was originally created from that image. In this way, a user can be satisfied that the card was an authorised card, and it is also more difficult for the user to assert that the card was tampered with and the transaction should not have been authorised. This therefore provides for a secure authentication of the veracity of the card presented for both the retailer and the user of the card.

It will be understood that the invention provides for a secure storage and indexing of user specific information using indexers which are specifically created for that user. The blinding function that creates the blinded identity element breaks the link between the identity of the user that provides the identity element and the processed identity element that is then used as the indexer. Providing this level of anonymity within a storage repository means that the data can be stored for longer periods more securely. In contrast to prior art attempts to securely store personalised data that simply relied on encryption of the data wherein a breaking of the encryption provides the stored data, the present invention stores the information in a manner that requires knowledge of the personal identifiers in order to retrieve data indexed with those identifiers. Enabling the safe storage of this data opens up the opportunity of other applications for example:

Using the data to decide when and how to update existing templates in a "biometric-aging" scheme and/or Applying the data in conjunction with biometric-based cryptography schemes A data storage architecture and methodology have been described that protects privacy and ensures security. The system includes a plurality of nodes in a networked architecture, the nodes being adapted to securely communicate and co-operate with one another to allow storage and retrieval of data. A single piece of biometric data is associated only with a blinded identifier and securely divided across one or more nodes, adapted for data storage. The data itself and the link to the original individual, from whom the biometric was acquired, cannot be obtained without the co-operation of two or more nodes.

It will be appreciated that the present invention has been described with regard to preferred illustrative and exemplary embodiments but that it is not intended to limit the invention in any way except as may be deemed in the light of the appended claims. Modifications can be made, and will be apparent to the person skilled in the art, with out detracting from the spirit or scope of the invention. Where the invention has been described with reference to modules or flow sequences it will be appreciated that these may be implemented in computer hardware or software or a combination of the two. Similarly, it will be understood that the use of the words comprises/comprising when used in this specification are to specify the presence of stated features, integers, steps or components but does not preclude the presence or addition of one or more other features, integers, steps, components or groups thereof.

The invention claimed is:

1. A method of securely indexing and storing a biometric for subsequent retrieval, the method including: using a processor to carry out the steps of:
   a) Enrolling a user at an enrolment location by effecting a capture of a specific biometric from that user and associating that biometric with an identity element specific to that user,
   b) Applying a blinding function to the associated identity element so as to provide a blinded identity element, the blinding function taking the identity element as a data input and providing the blinded identity element as a data output, the blinded identity element revealing no information about the data input,
   c) generating a transaction identifier at the enrolment location;
   d) associating the transaction identifier with each of the biometric and blinded identity elements to form two combinations,
   e) Separately forwarding each of the two combinations to a storage location which is remote from the enrolment location, matching transaction identifiers from each of the two combinations, and combining the blinded identity element and the biometric-as an index pair,
   f) Storing the index pair as a stored pair at the storage location, and
   g) Retrieving the biometric from the stored pair by subsequently providing the same identity element, applying the same blinding function to that element so as to recreate the blinded identity element and using the recreated blinded identity element to retrieve the biometric stored with that blinded identity element, wherein the step of forwarding the combination having the blinded identity element to the storage location is via an index governor, the index governor, on receiving a blinded identity element being configured to apply a second blind function to the blinded identity element so as to generate a doubly blinded identity element which is coupled to the transaction identifier for forwarding to the storage location for association with the biometric and storage as a stored pair.

2. The method as claimed in claim 1 wherein the biometric is encrypted prior to storage.

3. The method as claimed in claim 1 wherein a plurality of blinding functions are applied to the identity element, the plurality of functions being applied in a specific iterative order.

4. The method as claimed in claim 3 wherein a recreated blinded identity element is generated by applying the blinding functions to the identity element in the same order as that used to create the blinded identity element.

5. The method as claimed in claim 1 further including the step of sequentially forwarding the combination having the blinded identity element to a plurality of index governors prior to a final transmission of the blinded identity element to the storage location.

6. The method as claimed in claim 1 further including the step of splitting the biometric into two or more data outputs, each of the individual two or more data outputs being stored at separate locations and wherein in order to recreate the biometric it is necessary to subsequently recombine the data outputs.

7. The method as claimed in claim 6 including the step of further splitting a data output from a splitting function.

8. The method as claimed in claim 1 further including the steps of enrolling multiple biometrics for a specific user, collating the multiple enrolled biometrics into a single biometric set, and using a single identity element to index this biometric set.

9. The method as claimed in claim 1 further including the steps of enrolling multiple biometrics for a specific user, and using different identity elements for one or more of the multiple biometrics for indexing purposes.

10. The method as claimed in claim 1, further including the steps of:
   h) Retrieving a stored and indexed biometric from the stored pair by subsequently providing the same identity element, applying the same blinding function to that element so as to recreate the blinded identity element and using the recreated blinded identity element to retrieve the biometric stored with that blinded identity element, i) Using the retrieved biometric to generate an authenticating biometric template, j) Comparing the authenticating biometric template with the biometric template previously generated, and authenticating the veracity if the templates match.

11. A computer implemented biometric storage and authentication architecture, the architecture comprising a processor and computer readable memory storing programs comprising:

a) a first module configured to enable a enrolment of a user by effecting a capture of a specific biometric from that user and associating that biometric with an identity element specific to that user, b) a second module configured to effect an application of a blinding function to the associated identity element so as to provide a blinded identity element, the blinding function taking the identity element as a data input and providing the blinded identity element as a data output, the blinded identity element revealing no information about the data input, c) a third module configured to generate a transaction identifier and to associate the transaction identifier with each of the biometric and the blinded identity to form two combinations and to forward each for the two combinations separately to a remote repository, d) an index governor provided between the third module and the remote repository, the index governor being configured on receiving a blinded identity element to apply a second blind function to the blinded identity element so as to generate a doubly blinded identity element, the doubly blinded identity element being coupled to the transaction identifier for forwarding to the remote repository for association with the biometric and storage as a stored paid, e) a fourth module located at the remote repository and configured to match the transaction identifiers from each of the two separately received combinations so as to effect a combination of the blinded identity element and the biometric so as to form an index pair and effect storing of the index pair as a stored pair, and f) a retrieval module configured to enable a retrieval of the biometric from the stored pair by subsequently providing the same identity element, applying the same blinding function to that element so as to recreate the blinded identity element and using the recreated blinded identity element to retrieve the biometric stored with that blinded identity element.

12. The architecture as claimed in claim 11 wherein the repository and at least one of the first, second and third modules are provided on distinct nodes within a networked computer architecture.

13. The architecture as claimed in claim 11 wherein the second module is configured to apply multiple blinding functions in an iterative process, the resultant blinded identity element having been blinded through a plurality of steps.

14. The architecture as claimed in claim 11 further including an encryption module, the encryption module being configured to encrypt one or more of the elements of the stored pair.

15. The architecture as claimed in claim 11 further including a data splitting module, the data splitting module being configured to enable a splitting of at least one of the identity element or biometric into two or more constituent parts.

16. The architecture as claimed in claim 15 wherein the splitting module provides for a storage of each of the two or more constituent parts on separate nodes of the network.

* * * * *